United States Patent [19]

Wittmann et al.

[11] 4,395,496

[45] Jul. 26, 1983

[54] CURED CELLULOSE ESTER, METHOD OF CURING SAME, AND USE THEREOF

[75] Inventors: Joseph W. Wittmann; John M. Evans, both of Rochester, N.Y.

[73] Assignee: UCO Optics, Inc., Rochester, N.Y.

[21] Appl. No.: 321,506

[22] Filed: Nov. 16, 1981

[51] Int. Cl.³ .................. C08G 77/20; C08G 77/04; C08L 1/02; G03B 21/46

[52] U.S. Cl. .................. 523/107; 525/937; 527/311; 527/313; 528/32; 528/33; 528/43; 351/160 R; 351/160 H

[58] Field of Search .................. 523/106, 107; 525/54.21, 54.23, 937; 527/311, 313, 314; 528/32, 33, 43; 351/160 R, 160 H

[56] References Cited

U.S. PATENT DOCUMENTS

| | | | |
|---|---|---|---|
| R. 30,368 | 8/1980 | Loshaek et al. | 351/160 H |
| 3,012,952 | 12/1961 | Smith et al. | 204/158 |
| 3,645,939 | 2/1972 | Gaylord | 525/54.21 |
| 3,700,761 | 10/1972 | O'Driscoll et al. | 264/1 |
| 3,749,592 | 7/1973 | Gaske | 427/36 |
| 3,807,398 | 4/1974 | Grucza | 128/260 |
| 3,808,178 | 4/1974 | Gaylord | 526/245 |
| 3,808,179 | 4/1974 | Gaylord | 526/245 |
| 3,916,033 | 10/1975 | Merrill | 427/36 |
| 3,943,045 | 3/1976 | Cordrey et al. | 204/159.22 |
| 4,005,244 | 1/1977 | Wismer | 428/480 |
| 4,062,627 | 12/1977 | Waja et al. | 351/160 |
| 4,073,577 | 2/1978 | Höfer | 351/160 |
| 4,116,549 | 9/1978 | Harris | 351/160 |
| 4,120,570 | 10/1978 | Gaylord | 351/40 |
| 4,134,809 | 1/1979 | Pacifici et al. | 204/159.12 |
| 4,138,382 | 2/1979 | Palmenteer | 523/113 |
| 4,139,513 | 2/1979 | Tanaka et al. | 523/107 |
| 4,139,548 | 2/1979 | Tanaka et al. | 556/437 |
| 4,139,692 | 2/1979 | Tanaka et al. | 526/264 |
| 4,152,508 | 5/1979 | Ellis et al. | 526/279 |
| 4,153,641 | 5/1979 | Deichert et al. | 526/264 |
| 4,182,822 | 1/1980 | Chang | 526/264 |
| 4,189,364 | 2/1980 | Aelion et al. | 204/159.22 |
| 4,189,546 | 2/1980 | Deichert et al. | 528/26 |
| 4,208,506 | 6/1980 | Deichert et al. | 528/32 |
| 4,216,303 | 8/1980 | Novicky | 528/32 |
| 4,235,985 | 11/1980 | Tanaka et al. | 526/279 |
| 4,242,483 | 12/1980 | Novicky | 526/263 |
| 4,245,069 | 1/1981 | Covington | 525/479 |
| 4,246,389 | 1/1981 | LeBoeuf | 526/279 |
| 4,248,989 | 2/1981 | Novicky | 526/264 |
| 4,254,248 | 3/1981 | Friends et al. | 526/279 |
| 4,261,875 | 4/1981 | LeBoeuf | 523/107 |
| 4,276,402 | 6/1981 | Chromecek et al. | 526/245 |
| 4,277,595 | 7/1981 | Deichert et al. | 526/26 |
| 4,303,772 | 12/1981 | Novicky | 526/279 |
| 4,306,042 | 12/1981 | Neefe | 526/75 |
| 4,327,203 | 4/1982 | Deichert et al. | 526/279 |
| 4,341,889 | 7/1982 | Deichert et al. | 528/26 |
| 4,343,927 | 8/1982 | Chang | 526/262 |

OTHER PUBLICATIONS

Chem. Abst., vol. 75 (1971), 82365h.
Chem. Abst., vol. 76 (1972), 129059z.
Chem. Abst., vol. 81 (1974), 97808c.
Chem. Abst., vol. 82 (1974), 163056e.
Chem. Abst., vol. 83 (1975), 19056h.
Chem. Abst., vol. 84 (1976), 152388c, 158042j.
Chem. Abst., vol. 86 (1977), 30443q, 56315z, 56919z, 81723p, 131165f, 139872t.
Chem. Abst., vol. 78 (1973) 78146g.
Chem. Abst., vol. 87 (1977), 76330z, 152717y.
Chem. Abst., vol. 88 (1978), 97456f, 138039t, 154465j.
Chem. Abst., vol. 90 (1979), 105994p.
Chem. Abst., vol. 91 (1979), 22734y, 75815g, 99947c.
Chem. Abst., vol. 92 (1980), 164620c.
Chem. Abst., vol. 93 (1980), 104851q.
Chem. Abst., vol. 93 (1980), 228520a.

*Primary Examiner*—John Kight, III
*Assistant Examiner*—Nathan M. Nutter
*Attorney, Agent, or Firm*—Pollock, Vande Sande & Priddy

[57] ABSTRACT

Cellulose esters are cured by exposure to radiation preferably followed by exposure to elevated temperatures of at least about 100° C. In addition, polymers obtained from reacting certain cellulose esters with certain polymerizable silicon esters are provided. The cured cellulose esters are suitable for producing transparent parts such as contact lenses.

28 Claims, No Drawings

CURED CELLULOSE ESTER, METHOD OF CURING SAME, AND USE THEREOF

TECHNICAL FIELD

The present invention is concerned with novel contact lenses having good physical and optical characteristics and with the polymer compositions suitable for preparing the lenses. In addition, the present invention is directed to a process for curing certain polymer compositions and method for using the cellulose ester compositions.

BACKGROUND ART

Presently, contact lenses are constructed of certain types of plastic materials. For instance, hard or essentially semirigid contact lenses are predominantly made from polymethylmethacrylate. However, this material is not completely satisfactory because of its poor gas permeation characteristics. This, in turn, induces edema on the surface of the cornea in the region covered by the contact lens and thereby resulting in complications and poor vision.

In order to overcome this problem of insufficient gas permeability, it has been suggested to employ cellulose acetate butyrate as a contact lens. Although contact lenses prepared from cellulose acetate butyrate have improved gas permeability characteristics, satisfactory optical and transparency properties, are nontoxic and are physiologically compatible with the corneal tissue which they contact, such suffer from warping. This warping may be due to instability caused by internal stress as discussed by Pearson, Journal American Opthamology Association, 49(8), pages 972–929 (1978). An attempt to ameliorate this warping problem by exposing the lens blanks to an elevated temperature for a predetermined length of time prior to machining and grinding of the lens has been suggested. This heat treatment does eliminate warping to some extent. Post curing or annealing molded plastics in this manner is a commonly used method for relieving molded in stress.

In addition, it is desirable to include a plasticizer in cellulose acetate butyrate when employing such as a contact lens, in order to facilitate processing of the material and to increase the flexibility and comfort of the lens. However, the presence of plasticizers can also lead to instability of the lens such as by leaching out into aqueous media or by absorbing water. Moreover, the presence of the plasticizer itself, due to softening, results in some degree of warpage and long term creep.

DESCRIPTION OF INVENTION

The present invention improves the dimensional stability of contact lenses made from cellulose esters without significantly adversely affecting the gas or oxygen permeability of the material. In addition, the present invention makes it possible to achieve this and still maintain sufficient flexibility, proper modulus of elasticity, and necessary optical characteristics. The present invention makes it possible to produce contact lenses which are comfortable and can be worn over extended periods of time. In addition, the materials prepared according to the present invention are transparent, have a low water absorption rate, increased hardness and increased scratch resistance.

In addition to the above discussed characteristics, materials to be suitable for contact lenses must possess a number of other important characteristics. For instance, the material must have a uniform refractive index, and it must be stable in the presence of light during its lifetime. Furthermore, the material must be machinable and moldable and strongly resistant to acids and lipids of the types secreted by the human eye.

The present invention is directed to a polymer which is obtained from the polymerization of a composition which includes an organic cellulose ester and a polymerizable silicone ester. The cellulose ester is cellulose acetate, cellulose acetate butyrate, cellulose acetate propionate, or mixtures thereof. The silicone ester is an ethylenically unsaturated silicone ester such as an ester of an ethylenically unsaturated carboxylic acid. Examples of suitable acids are acrylic acid, methacrylic acid, crotonic acid and mixtures thereof. In addition, the present invention is directed to a shaped transparent contact lens of concavo-convex shape with the concave surface substantially conforming to the cornea of the eye and being formed of the above described polymer composition.

The present invention is also directed to a process for obtaining a cured transparent cellulose ester composition. The process comprises subjecting the cellulose ester composition which can also include such components as a photoinitiator, photosensitizer, antioxidant and crosslinker, to $\gamma$ irradiation or to ultraviolet light or to daylight fluorescent radiation in the range of about 200 to about 800 nm. The composition is then preferably subjected to elevated temperatures of at least about 100° C., and preferably above the Tg (glass transition temperature) of the molded material. The present invention is also directed to buttons or contact lenses obtained by the above described process.

DESCRIPTION OF BEST AND VARIOUS MODES OF CARRYING OUT INVENTION

The organic cellulose esters suitable in the present invention include cellulose acetate, cellulose acetate butyrate and cellulose acetate propionate, and preferably cellulose acetate butyrate. Mixtures of cellulose esters can be employed if desired. The preferred organic cellulose esters suitable in the present invention include cellulose acetate having an acetyl content of about 36 to about 40 percent by weight, cellulose acetate butyrate having an acetyl content of about 11 to about 15 percent by weight and a butyryl content of about 34 to about 40 percent by weight, and cellulose acetate propionate having an acetyl content of about 2 to about 9 percent by weight and a propionyl content of about 40 to about 49 percent by weight. Most preferably, the organic cellulose ester suitable in the present invention is a cellulose acetate butyrate having an acetyl content of about 13 to 15 weight percent, based on the weight of the cellulose acetate butyrate, a butyryl content in the range of about 36 to 38 weight percent, based on the weight of the cellulose acetate butyrate, a hydroxyl content in the range of about 1.5 to 2.5 weight percent, based on the weight of the cellulose acetate butyrate, and a viscosity in the range of about 17 to 28 seconds as determined by the Ball-Drop Method, ASTM Designation D-1343, Formula A.

The compositions containing the organic cellulose esters are cured according to the present invention by subjecting the composition to irradiaton by $\gamma$-rays or ultraviolet light (UV) or daylight fluorescent light in the range of about 200 to 800 nm. The use of UV in the range of about 200 to about 400 nm is preferred. An ultraviolet source providing an intensity of 0.01–6.0×10³ μW/cm² at about 3.0–30.0 cm has been found suitable. The amount of time of the exposure to the radiation is about 0.1 to 100 hours, and preferably about 15 to about 65 hours.

The exposure to radiation is preferably carried out at normal room temperatures. However, higher or lower temperatures such as about 0° C. to about 100° C. can be used when desired.

The composition is then preferably subjected to elevated temperatures of at least about 100° C., preferably about 100° C. to about 150° C., and most preferably about 120° C. to about 140° C. The composition is treated at the elevated temperature for about 0.5 to 5 hours, and preferably about 0.5 to about 3 hours.

Also, if desired, the compositions can be subjected to additional heating at said elevated temperatures prior to the irradiation.

When used for producing contact lenses, the compositions after being extruded into rods and then cut into discs and subjected to the radiation and heat treatments can then be cut into lenses or can be injection molded into "buttons" subjected to the radiation and heat treatment and then lathed to provide lenses, or molded directly into lenses with similar subsequent processing.

The curable compositions of the present invention can contain up to about 35 percent by weight, preferably about 1 to about 35 percent by weight, more preferably about 5 to about 30 percent by weight, and most preferably about 5 to 15 percent by weight of a polymerizable ethylenically unsaturated silicone ester. Examples of suitable silicone esters are silicone esters of ethylenically unsaturated carboxylic acids; silane monomers containing vinyl group; and silane monomers containing allyl group. The preferred esters are monoethylenically unsaturated. The carboxylic acids from which the silicone esters can be obtained are preferably aliphatic, monocarboxylic, and monoethylenic. Examples of suitable ethylenically unsaturated acids are acrylic acid, methacrylic acid, and crotonic acid. Mixtures of silicone esters can be employed when desired.

Examples of some suitable silicone esters are represented by the following formula I:

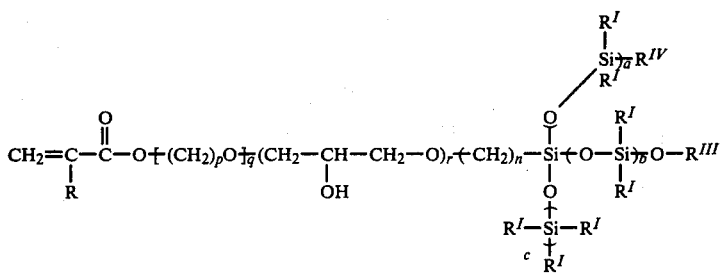

wherein
R is hydrogen or methyl;
each $R^I$ individually is methyl, phenyl or $O\text{---}SiR_3^{II}$;
each $R^{II}$ individually is methyl or phenyl;
$R^{III}$ is $SiR_3^{II}$ and $R^{IV}$ is $OSiR_3^{II}$ or $R^{III}$ and $R^{IV}$ together form a single bond to form a cyclic ring;
each a, b, and c individually is an integer of 0–3;
p is an integer of 2–4;
q is an integer of 0–20;
n is an integer of 1–3; and
r is an integer of 0–1.

Preferred silane monomers falling within the scope of formula I are represented by the following formula II:

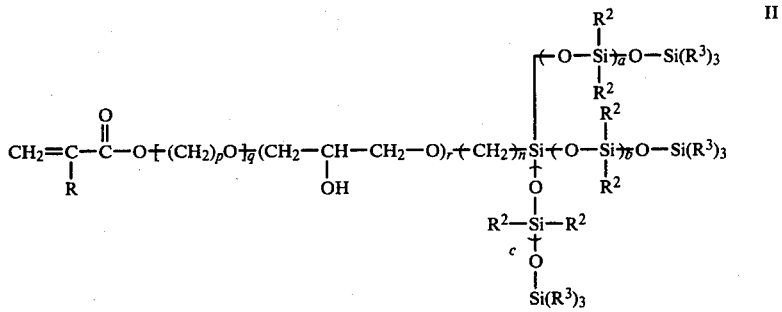

wherein
R is H or methyl;
each $R^2$ individually is $CH_3$, phenyl or $O\text{---}Si(CH_3)_3$;
each $R^3$ individually is $CH_3$ or phenyl;
each a, b, and c individually is an integer of 0–3;
p is an integer of 2–4;
q is an integer of 0–20;
n is an integer of 1–3; and
r is an integer of 0–1.

Examples of other suitable silicone esters are represented by the following formula III.

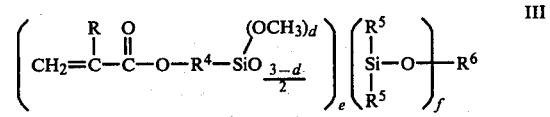

wherein
R is H or methyl;
$R^4$ is a divalent hydrocarbon radical having 1 to 10 carbon atoms, such as an alkylene bridge, or a divalent hydrocarbon bridge having 1 to 10 carbon atoms and being broken by oxygen linkage;

each $R^5$ is $CH_3$;
$R^6$ is $CH_3O_{0.5}$ or $(CH_3)_3SiO_{0.5}$;
each d is an integer of 0–2;
e is an integer of 1–3; and
f is an integer of 0–100, and provided that when f is 0, d is at least 1.

Examples of vinyl and allyl silane monomers are represented by the following formula IV:

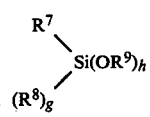

wherein
$R^7$ is vinyl or allyl;
each $R^8$ individually is a monovalent saturated aliphatic hydrocarbon radical or a monovalent aromatic hydrocarbon radical;
each $R^9$ individually is an alkyl radical;
g is an integer of 0–2;
h is an integer of 1–3; and
the sum of g and h is 3.

Preferably, $R^8$ is an alkyl radical of from 1–6 carbon atoms or an aryl radical containing 6–10 carbon atoms.

Preferably, $R^9$ is an alkyl radical containing 1–6 carbon atoms.

Examples of some suitable compounds of formula I above are:

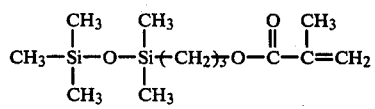

γ-Pentamethyldisiloxanylpropyl methacrylate,

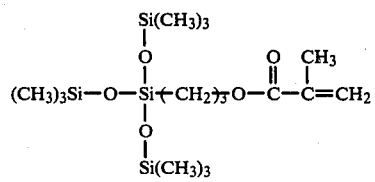

Tris [trimethylsiloxy]-α-methacryloxypropylsilane,

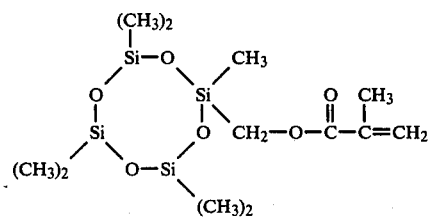

Heptamethylcyclotetrasiloxanyl methyl methacrylate,

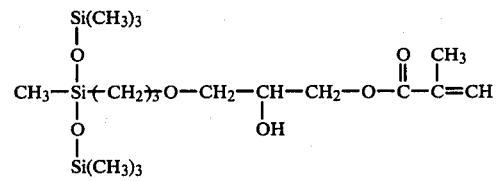

methyldi(trimethylsiloxy)sylylpropylglycerol methacrylate,

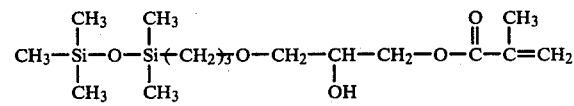

Pentamethyldisiloxanyl (propylglycerol) monomethacrylate, and

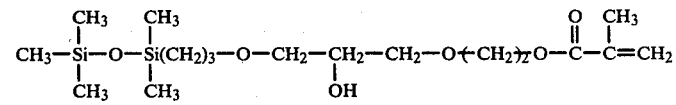

Pentamethyldisiloxanyl (propylglycerol) ethyleneglycol monomethacrylate.

Examples of some suitable silane monomers of formula IV are vinyltriethoxysilane, vinyltrimethoxysilane, vinylphenyldimethoxysilane, and vinyltributoxysilane, and their corresponding allyl compounds.

Lenses lathed from cured compositions containing such silicone esters and silane monomers are wettable as evidenced by measurements made of water contact angle after exposing the materials to hard lens wetting solutions.

In addition, it may be desirable to include one or more di- or polyethylenically unsaturated compounds to act as a crosslinking agent. Examples of some crosslinking agents are acrylate or methacrylte diesters of di- or polyhydric alcohols or phenols such as ethylene glycol diacrylate or dimethacrylate, 1,6-hexandiol diacrylate or dimethacrylate, diethylene glycol diacrylate or dimethacrylate, triethylene glycol diacrylate or dimethacrylate, tetraethylene glycol diacrylate or dimethyacrylate, polyethylene glycol 600 diacrylate or dimethacrylate, bisphenol A diacrylate or dimethacrylate, ethoxylated bisphenol A diacrylate or dimethacrylate, pentaerythritol triacrylate or trimethacrylate, trimethylolpropane triacrylate or trimethacrylate, tripropylene glycol diacrylate or dimethacrylate, pentaerythritol tetraacrylate or tetramethacrylate; acrylamides such as methylene bisacrylamide or bismethacrylamide, and hexamethylene-bisacrylamide or bismethacrylamide; and divinyl or diallyl esters such as divinyl benzene, diallyl phthalate, and diallyl isophthalate; and silicone diesters of monoethylenically unsaturated acids such as acrylic acid, methacrylic acid and crotonic acid including those represented by the formula V:

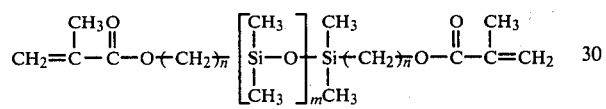

wherein n is an integer of 1-4 and m is an integer of 1-20.

When employed, the crosslinking agent is presentin amounts of up to about 10% by weight, and preferably about 0.1 to about 5% by weight. The crosslinking agents are not entirely necessary according to the present invention since crosslinking can be attained without such by the exposure to the irradiation described herein.

The compositions of the present invention preferably, but not necessarily, can include photoinitiators and/or photosensitizers. Examples of some photoinitiators are: fluorenone; 4-nitrofluorene, 4-nitrobiphenyl; N-acetyl-4-nitro-1-naphthylamine; 2,3-dibenzoyloxirane; biacetyl; benzophenone; 9,10-phenanthrenequinone, xanthone; 9,10-anthraquinone; 3,3',4,4'-benzophenone tetracarboxylic dianhydride; 5,5'-dipheyl dithiocarbonate, thioanthone; 2-chlorothioxanthone; benzoin ethers, such as methyl, ethyl, butyl, propyl, isopropyl and higher homologs; benzoin; deoxybenzoin; benzil; α-methoxy-α-phenylacetophenone; α,α-dimethoxy-α-phenylacetophenone; α,α-diethoxyacetophenone; benzoquinone; tetramethyldiaminobenzophenone (Michler's Ketone); O-arylated α-oximinoketones, such as 1-phenyl-1,2-propane-dione-2-0-benzoylamine; combinations of quinoline-8-sulfonyl chloride and thioxanthone with the latter being the photosensitizer; aromatic disulfides such as B,B'-dinaphthyl disulfide and diphenyl disulfide; acetophenone; and derivatives thereof such as 2-chloroacetophenone; p-tert-butyl trichloroacetophenone; 2-bromoacetophenone, and 2-phenylacetophenone; 4-methoxybenzophenone; 4-chlorobenzophenone; benzaldehyde; and 4,4'-dimethyl-benzophenone.

Additional photoinitiators include compounds represented by the following structural formulas:

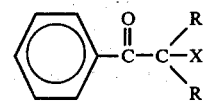

wherein X is a halogen such as Cl or Br, and each R individually is a halogen such as Cl or Br, H, phenyl or an alkyl containing 1-12 carbon atoms.

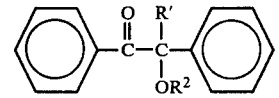

wherein R' is H, CH$_2$OH, alkyl of 1 to 12 carbon atoms, phenyl, CH$_2$O-tosyl,

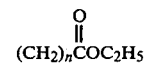

wherein n is 1 or 2, or CH$_2$CH=CH$_2$, and R$^2$ is H, alkyl of 1 to 12 carbon atoms, phenyl or Si (CH$_3$)$_3$; N-alkyl benzophenone-4-carboxylic acid esters of the formula:

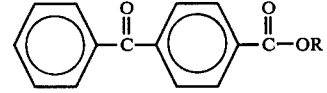

wherein R is alkyl of 1 to 12 carbon atoms;

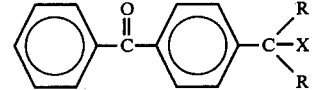

wherein X is a halogen such as Cl or Br, and each R individually is a halogen, such as Cl or Br, H or alkyl of 1-12 carbon atoms. Desyl aryl sulphides of the formula:

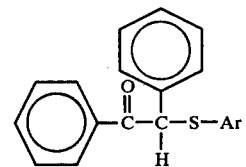

wherein Ar is phenyl, O-tolyl, p-tolyl, p-anisyl, or B-naphthyl; and including phenyl phenacyl sulphide;

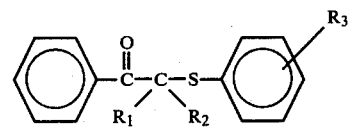

wherein R$_1$ and R$_2$ individually is H, phenyl, or alkyl of 1 to 12 carbon atoms, and R$_3$ is H or p-Cl, and a preferred example of which is when each of R$_1$ and R$_2$ is H;

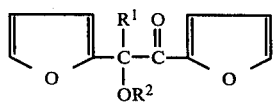

wherein R¹ and R² individually is H, phenyl, alkyl of 1 to 12 carbon atoms;

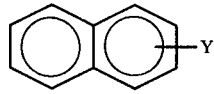

wherein Y is CH₂Cl or SO₂Cl;

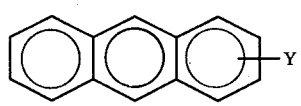

wherein Y is CH₂Cl or SO₂Cl;

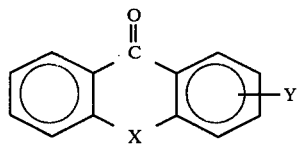

wherein Y is CH₂CL or SO₂Cl; and X is CH₂, O, S, or

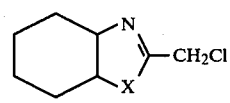

wherein X is O, S or NR and R is H or CH₃;

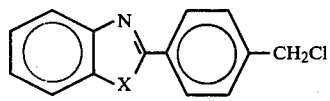

wherein X is O, S or NR and R is H or CH₃.

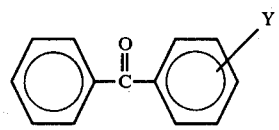

wherein Y is CH₂Cl or SO₂Cl;

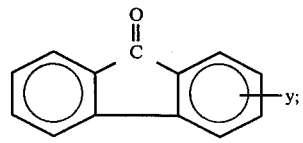

wherein Y is CH₂Cl or SO₂Cl

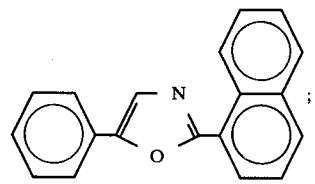

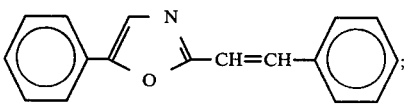

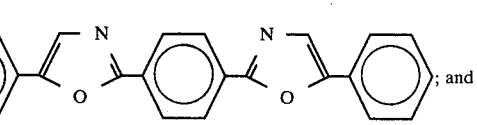

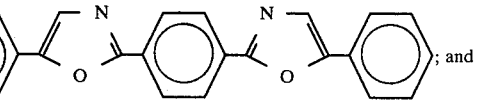

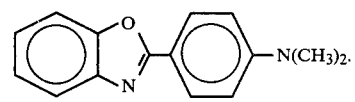

The photoinitiators are generally used in amounts of 0 to about 10% by weight, preferably about 0.1 to about 10%, and most preferably about 0.1 to 5%. In the event the composition includes an antioxidant, it may be desirable to raise the level of the photoinitiator to overcome the inhibitor effect of antioxidant.

The compositions of the present invention can also contain an auxiliary compatible plasticizer. Examples of auxiliary plasticizers are relatively low molecular weight organic esters; chlorinated paraffins; phosphoric acid derivatives such as tributyl, triphenyl, tricresyl and trioctyl phosphates; epoxidized vegetable oils, such as epoxidized soybean oil, polymeric plasticizers such as polyalphamethyl styrene and polyesters; sulfonamides such as N-cyclohexyl p-toluene sulfonamides. With respect to the organic esters, a convenient way to designate such is to refer to the carboxylic acids and organic alcohols from which the esters can, but not necessarily must, be obtained. Suitable esters include the products formed from mono- or polyacids with linear or branched-chain monohydroxy alcohols or polyols.

Examples of suitable aromatic mono- and polyacids are benzoic acid, phthalic acid, and trimellitic anhydride. Such aromatic acids may contain other substituent groups in the aromatic ring to modify the properties of the resulting plasticizer. Examples of suitable aliphatic acids are fatty acids with less than 20 carbon atoms, e.g., acetic, propionic, butyric, lauric, palmitic, stearic and crotonic acids, dicarboxylic acids such as adipic, glutaric, azaleic, and sebacic, and hydroxy-substituted carboxylic acids such as citric and ricinoleic.

Examples of suitable monohydroxy alcohols are the straight and branched-chain aliphatic alcohols containing from one to 20 carbon atoms. Examples of suitable alcohols are methyl alcohol, ethyl alcohol, butyl alcohol, hexyl alcohol, n-octyl alcohol, 2-ethylhexyl alcohol, decyl alcohol, octadecyl alcohol. The alcohols may contain more than one hydroxy group, i.e., they may be polyols, examples of which are ethylene, diethylene and dipropylene glycols, butanediol and glycerol. Examples of suitable aromatic alcohols are benzyl alcohol and phenol. The esters may be mono, di, tri or higher substituted esters of multifunctional acids or multifunctional alcohols. By way of illustration, specific examples of suitable plasticizers include diethyl phthalate, dibutyl phthalate, diisobutyl phthalate, dihexyl phthalate, dioctyl phthalate, butyl benzyl phthalate, dodecyl phthalate, dicyclohexyl phthalate; diethyl adipate, dibutyl adipate, diisobutyl adipate, dihexyl adipate, dioctyl adipate, dibutyl azelate, dihexyl azelate, dioctyl azelate, dibutyl sebacate, dioctyl sebacate, butyl benzoate, glyceryl triacetate (triacetin), glyceryl tributyrate, dibutyl citrate, tributyl citrate, butyl stearate, glycerylmonooleate, trioctyl trimellitate, triethyl citrate, acetyl triethyl citrate, acetyl triheptyl citrate, polyethylene glycol di(2-ethyl hexoate).

Some other commercially available suitable plasticizers include NP10 polymer plasticizer, Paraplex G-31, Paraplex G-40, Paraplex G-54, and Plasthall P-7035 and P-550 which are based on glutaric acid.

Auxiliary plasticizers are generally used in amounts of 0–30 percent by weight, preferably about 5–15 percent by weight.

Antioxidants may also be employed to hinder or prevent thermal decomposition or discoloration when the composition is processed. Antioxidants employed are of the hindered phenol type usually employed to stabilize a plastic composition.

Examples of such antioxidants are Irganox 1010, Irganox 1076 and Irganox 259. Antioxidants are generally used in amounts of 0–2 percent by weight and preferably about 0.1–1 percent by weight.

The following nonlimiting examples are presented to further illustrate the present invention wherein all parts are by weight unless the contrary is stated.

EXAMPLE 1

Part A

A film of about 0.15 mm thickness is cast from a composition containing about 60 parts by weight of a 10 percent solution of cellulose acetate butyrate, commercially available under the trade designation CAB 381-20, in methyl ethyl ketone; about 0.7 parts by weight of a methacrylate silicone monomer available under the trade designation F-820 from SWS Silicones; about 0.3 parts by weight of tetraethylene glycol diacrylate crosslinking agent, and about 0.3 parts by weight of benzoin methyl ether.

The film is air dried and then irradiated at a band max of 365 nm with a Blak-Ray Model XX-15 lamp (Ultra Violet Products, Inc.) containing two 15 watt-filtering black light blue tubes at a distance of 3.0 cm. The lamp is rated at $1100\mu$ watts/cm$^2$ at a distance of 30.5 cm. After irradiation for 15½ hours, a high degree of crosslinking of 70 percent insolubles is obtained after a 24 hour extraction with acetone.

The percent of insolubles is based on the total weight of the formulated resin minus the weights of inert components such as nonpolymerizable plasticizer and photoinitiator, if present.

The irradiated film is heated in a vacuum oven at about 130° C. for about 1 hour resulting in further crosslinking to provide about 82 percent acetone insolubles.

The irradiated and heat treated film is flexible, transparent and slightly yellow.

Part B

Part A is repeated except that the composition does not contain methyl ethyl ketone and is compression molded to form a film. The percent insolubles of the film in acetone after irradiation is about 59 percent and after irradiation and heating is about 79 percent. A comparison of the results of Parts A and B indicated that the methyl ethyl ketone does not significantly affect the crosslinking.

Part C

Part B is repeated except that the composition contains 1 percent of Irganox 1010 antioxidant. The results obtained are similar to those of Part B above.

EXAMPLE 2

Shapes in the form of "buttons" or small cylinders are fabricated from the composition of Part C of Example 1, except that 1.0 part by weight of F820 is used, by extruding the composition into a button shaped mold. The buttons obtained are irradiated for 15½ hours and heat annealed at 120° C. for about 2 hours. The cured buttons are then lathed to form contact lenses. Oxygen transmission data is obtained for these cured lenses, commercial lenses made from a plasticized cellulose acetate butyrate (i.e. Tenite 217E and Tenite 201E), and uncured lenses with the same formulation as the cured lenses. The data is presented in Table I below:

TABLE I

| Material | Center Thickness | Transmissibility DK ml. cm./sec. cm$^2$. cm. Hg $\times$ 10$^{10}$ |
|---|---|---|
| Cured System | .11 mm | 4.4 |
| Uncured System | .11 mm | 6.3 |
| Tenite 217E | .11 mm | 5.1 |
| Tenite 201E | .11 mm | 4.7 |

The cured lenses are then subjected to acetone extraction and a value of 36 percent insolubles is obtained showing that the lenses are crosslinked. The degree of crosslinking is not as high as that for the film of Part C of Example 1, since the buttons which are irradiated have much greater thickness than the films, and the effects of UV radiation varies with thickness.

EXAMPLE 3

Part A of Example 1 is repeated except that the composition does not contain any benzoin methyl ether photoinitiator. The irradiated and heat treated films have 36 percent insolubles upon extraction with acetone. The films are transparent, colorless and flexible.

In addition, buttons are obtained by extruding the composition of Part A of Example 1 which does not contain the methyl ethyl ketone and the benzoin methyl ether into a button-shaped mold. The buttons are irradiated for about 15½ hours and then heated at about 120° C. for about 2 hours. The buttons are lathed to form lenses. The lenses have 45 percent insolubles upon extraction with acetone. The cured lenses have an O$_2$ transmissibility of $5.2 \times 10^{-10}$ ml.cm./sec.cm$^2$.cm.Hg. Lenses from the uncured buttons have an O$_2$ transmissibility value of $5.5 \times 10^{-10}$ ml.cm./sec.cm$^2$.cm.Hg. This example illustrates the effectiveness of the present invention without requiring a photoinitiator.

EXAMPLE 4

Table II hereinbelow is a tabulation of a number of compositions and results obtained in accordance with the present invention. The films are cast from methyl ethyl ketone solutions unless noted otherwise. The films are irradiated for about 15½ hours in the long UV region with a maximum at 365 nm, followed by heating in a vacuum oven at 130° C. for about 1 hour. Run 12 below illustrates the necessity of heat treatment to achieve the desired maximum degree of crosslinking. Note that from examples 19 through 21, crosslinking can be achieved in the absence of a crosslinker, i.e. from a composition consisting of only the cellulose ester, plasticizer and photoinitiator.

TABLE II

| Runs | Plasticizer | Other | Crosslinker | Photoinitiator | % Insolubles | Film Properties |
|---|---|---|---|---|---|---|
| 1 | F820, 10 | | DEGDA, 4.3 | None | 63 | T, C, F |
| 2 | F820, 10 | | HDDA, 4.3 | None | 45 | T, C, F |
| 3 | F820, 9.6 | | DEGDA, 4.1 | BME, 4.1 | 83 | T, Y, B |
| 4 | F820, 9.6 | | HDDA, 4.1 | BME, 4.1 | 82 | T, Y, B |
| 5 | F820, 10 | | TEGDA, 2.1 | BME, 2.1 | 78 | T, SY, B |
| 6 | F820, 10 | | DEGDMA, 4.3 | None | 10 | T, C, SB to F |
| 7 | F820, 9.6 | | DEGDMA, 4.1 | BME, 4.1 | 80 | T, SY, B |
| 8 | F820, 10 | | DEGDMA, 2.1 | BME, 2.1 | 73 | T, OW, F |
| 9 | F820, 10 | I-1010, 1 | DEGDMA, 2.1 | BME, 2.1 | 70 | T, OW, F |
| 10 | F820, 10 | | HDDMA, 4.3 | None | 12 | T, C, F |
| 11 | F820, 14.3 | | DEGDA, 2.0 | BME, 2.0 | 74 | T, Y, F |
| 12 | F820, 14.6 | | DEGDA, 0.84 | BME, 0.84 | 65.23$^a$ | T, SY, F |
| 13 | F820, 10.3 | | DEGDMA, 0.90 | BME, 0.90 | 61 | T, C, SB |
| 14 | F820, 10.3 | | HDDA, 0.90 | BME, 0.90 | 63 | T, C, F |
| 15 | F820, 9.6 | | PEG600DA, 4.1 | BME, 4.1 | 77 | T, Y, B |
| 16 | F820, 9.6 | I-1010, 1 | HDDMA, 2.1 | BME, 2.1 | 68 | T, SY, F |
| 17 | F820, 9.6 | | HDDMA, 4.1 | BME, 4.1 | 81 | T, Y, SB |
| 18 | F820, 9.6 | | TEGDMA, 4.1 | BME, 4.1 | 65 | T, SY, B |
| 19 | F820, 10 | | None | BME, 4.1 | 77 | T, Y, SB |
| 20 | DBS, 13.7 | | None | BP, 7.8 | 98 | T, Y, B |
| 21 | DBS, 13.7 | | None | BME, 7.8 | 40 | T, Y, B |
| 22 | S160, 12.7 | | DEGDA, 7.3 | BME, 7.3 | 85 | T, Y, SB to F |
| 23 | S160, 12.7 | | DEGDA, 7.3 | BP, 7.3 | 92 | T, Y, B |
| 24 | S160, 13.7 | | None | BP, 7.8 | 92 | T, T, B |
| 25 | DOP, 12.7 | | DEGDA, 7.3 | BME, 7.3 | 76 | T, Y, SB |
| 26 | S160, 13.7 | | DEGDA, 7.8 | none | 68, 55$^{a'}$ | T, Y, SB |
| 27 | S160, 13.7 | | TEGDA, 7.8 | none | 31, 35$^{a'}$ | T, SY, F |
| 28 | S160, 12.7 | | DEGDA, 7.3 | DOB, 7.3 | 79 | T, Y, B |
| 29 | S160, 12.7 | | TEGDA, 7.3 | DOB, 7.3 | 75 | T, Y, B |
| 30 | S160, 13.7 | | None | DOB, 7.8 | 54 | T, Y, B |
| 31 | S160, 12.7 | | DAIP, 7.3 | BME, 7.3 | 64 | T, Y, B |
| 32 | S160, 12.7 | | TEGDA, 7.3 | BME, 7.3 | 66 | T, Y, F (Compression molded) |
| 33 | S160, 12.7 | | TEGDA, 7.3 | BME, 7.3 | 86, 60$^{a'}$ | T, Y, F |
| 34 | S160, 13.7 | | TEGDA, 3.9 | BME, 3.9 | 65 | T, Y, F |
| 35 | S160, 12.7 | | DEGDMA, 7.3 | BME, 7.3 | 66 | T, Y, B |
| 36 | S160, 13.7 | | DAIP, 3.9 | BME, 3.9 | 61 | T, Y, F |
| 37 | S160, 14.3 | | TEGDA, 4.1 | none | 5 | T, Y, F |
| 38 | S160, 12.7 | | PEG600DA, 7.3 | BME, 7.3 | 57.5 | T, Y, F |
| 39 | S160, 13.7 | | DEGDA, 3.9 | BME, 3.9 | 69 | T, Y, F |
| 40 | S160, 13.7 | | PEG600DMA, 3.9 | BME, 3.9 | 54 | T, Y, SB to F |
| 41 | S160, 13.7 | | HDDA, 3.9 | BME, 3.9 | 71 | T, Y, F |
| 42 | S160, 13.7 | | DEGDA, 3.9 | DMPA, 3.9 | 64 | T, Y, F |
| 43 | S160, 13.7 | | DEGDA, 3.9 | BP, 3.9 | 90 | T, Y, SB |
| 44 | S160, 13.7 | | DEGDA, 3.9 | BZ, 3.9 | 58 | T, Y, F |
| 45 | S160, 14.3 | | HDDMA, 2.0 | BME, 2.0 | 42 | T, SY, F |
| 46 | S160, 14.2 | I-1010, 0.90 | HDDMA, 2.0 | BP, 2.0 | 68 | T, SY, F |

TABLE II-continued

| Runs | Plasticizer | Other | Crosslinker | Photoinitiator | % Insolubles | Film Properties |
|---|---|---|---|---|---|---|
| 47 | S160, 14.2 | | HDDMA, 2.0 | BP, 2.0 | 64 | T, C, F[1] |

DEGDA — Diethylene glycol diacrylate
HDDA — 1,6-Hexanediol diacrylate
TEGDA — Tetraethylene glycol diacrylate
DEGDMA — Diethylene glycol dimethacrylate
HDDMA — 1,6-Hexanediol dimethacrylate
PEG600DA — Polyethylene glycol 600 diacrylate
TEGDMA — Tetraethylene glycol dimethacrylate
DAIP — diallyl isophthalate
PEG600DMA — Polyethylene glycol 600 dimethacrylate
I-1010 — Irganox 1010
DBS — dibutyl sebacate
S-160 — Santicizer-160 (butyl benzyl phthalate)
DOP — dioctyl phthalate
BME — Benzoin methyl ether
BP — Benzophenone
DMPA — 2,2-Dimethoxy-2-phenyl acetophenone
BZ — Benzil
DOB — Deoxybenzoin
T — Transparent
Y — Yellow
SY — Slightly yellow
C — Colorless
OW — Off-white
B — Brittle, split in two from a fingernail crease
SB — Semi-brittle, partially split from a fingernail crease
F — Flexible, no split from a fingernail crease
[a]After irradiation, but no heating
[d]Duplicate Runs

EXAMPLE 5

Table III hereinbelow is a tabulation of a number of compositions and results obtained in accordance with the present invention. The films are cast from methyl ethyl ketone solutions unless noted otherwise. The films are irradiated from about 18 hours in the short UV region with a maximum at 254 nm, followed by heating in a vacuum oven at 130° C. for about 1 hour. The irradiation is achieved by using a multipurpose lamp available under the trade designation 6281-K10 from A. N. Thomas Co. with a rated intensity of 17μ watts/cm² at 1 meter.

In Run 11, the film is a compressed molded film. The lower degree of crosslinking obtained as compared to solvent cast film indicates the possibility of the solvent and/or degree of mixing having a noticeable effect on the crosslinking.

TABLE III

| Runs | Plasticizer | Crosslinker | Photoinitiator | Insolubles | Film Properties |
|---|---|---|---|---|---|
| 1 | S-160, 13.7 | HDDA, 7.8 | None | 54, 39.5[a,b] | T, Y, B |
| 2 | S-160, 13.7 | DEGDA, 7.8 | None | 49 | T, Y, B |
| 3 | S-160, 12.7 | DEGDA, 7.3 | DOB, 7.3 | 44 | T, Y, SB |
| 4 | S-160, 12.7 | TEGDA, 7.3 | DOB, 7.3 | 38, 33[a,b] | T, Y, F |
| 5 | S-160, 15 | None | None | 12, 6[a,b] | T, Y, F |
| 6 | S-160, 13.7 | TEGDA, 7.8 | None | 22[b] | T, Y, F |
| 7 | S-160, 12.7 | HDDA, 7.3 | BP, 7.3 | 50[b] | T, Y, B |
| 8 | S-160, 12.7 | DEGDA, 7.3 | BME, 7.3 | 59[b] | T, Y, F |
| 9 | S-160, 13.7 | DEGDA, 7.8 | None | 50[b] | T, Y, F |
| 10 | S-160, 12.7 | HDDA, 7.3 | DOB, 7.3 | 47[b] | T, Y, SB to F |
| 11 | S-160, 12.7 | DEGDA, 7.3 | BME, 7.3 | 33[b] | T, Y, F |
| 12 | S-160, 13.7 | PEG600DA, 7.8 | None | 11.5[b] | T, Y, F |
| 13 | F820, 9.6 | DEGDA, 8.2 | None | 80[b] | T, Y, SB |
| 14 | F820, 10 | DEGDA, 4.3 | None | 73[b] | T, Y, F |

For Code see Table II
[b]Irradiated for 8 hours

EXAMPLE 6

Table IV hereinbelow is a comparison of a composition of the present invention being subjected to UV radiation and heating at 120° C. for 2 hours and one not being subjected to radiation.

TABLE IV

| Formulation | Radiation at 365 nm | Hardness Shore D | % Insolubles (Lenses) |
|---|---|---|---|
| 1. CAB-381-20, 74.8% F820, 13.2 TEGDA, 3.8 G-31, 4.4 BME, 3.8 | None | 64 | 0 |
| 2. Same as 1 | Yes | 74 | 50 |

EXAMPLE 7

About 17 parts by weight of CAB 381-20 are admixed with about 3 parts by weight of a silicone methacrylate F-820, about 0.86 parts by weight of tetraethylene glycol diacrylate, about 0.86 parts by weight of benzoin methyl ether and about 0.10 parts by weight of Irganox 1010 employing a mortar and pestle. About 2 to about 4 parts by weight of the composition are loaded into a Mini Max holder manufactured by Custom Scientific Instruments, Inc. for melt mixing at 160°–165° C. and extrusion into a button mold maintained at 120°–130° C. The buttons fabricated in this way are irradiated with a daylight fluorescent lamp for about 15.5 hours at a distance of approximately 3 cm from the lamp, followed by heat treating at 130° C. for 1 hour and cooled to room temperature. Acetone extraction of one of the buttons gives an average of 44% of acetone insolubles. The buttons are transparent and slightly yellow.

EXAMPLE 8

Following the general procedure of Example 7, about 18 parts by weight of CAB-381-20 are admixed with about 3.15 parts of F-820, about 0.45 parts of benzophenone and about 0.10 parts of Irganox 1010. Melt mixing is accomplished at 170°-180° C. The composition is extruded into a button mold maintained at 135°-145° C. The buttons fabricated in this way are irradiated with a Blak-Ray Model XX-15 lamp at a distance of 3.0 cm for 64 hours, followed by heat treating at 130° C. for 1 hour and cooled to room temperature. Acetone extraction of the buttons gives an average of 48% of acetone insolubles. The buttons are yellow and slightly hazy. Lenses made from these buttons give an oxygen transmissibility of $3.6 \times 10^{-10}$ ml.cm./sec.cm$^2$.cm.Hg.

EXAMPLE 9

Following the general procedure of Example 7, about 3 parts by weight of tris (trimethylsiloxy)-γ-methacryloxypropylsilane are substituted for the F-820 and essentially the same procedure is followed as in Example 7 except melt mixing is accomplished at 155°-165° C. and the mix is extruded into the button mold maintained at 125°-135° C. The buttons are irradiated with a Blak-Ray Model XX-15 lamp at a distance of 3.0 cm for 15½ hours, followed by heat treating at 130° C. for 1 hour and cooling to room temperature. Acetone extraction of one of the buttons gives an average of 43 percent of acetone insolubles. The buttons are transparent and slightly yellow. Lenses lathed from these buttons have an O$_2$ transmissibility value of $5.2 \times 10^{-10}$ ml.cm./sec.cm$^2$.cm.Hg. Lenses from the uncured buttons have an O$_2$ transmissibility value of $6.0 \times 10^{-10}$ ml.cm./sec.cm$^2$.cm.Hg.

EXAMPLE 10

Following the general procedure of Example 7, about 3 parts by weight of pentamethyldisiloxanyl (propylglycerol) monomethacrylate (structure given below) are substituted for F-820 and essentially the same procedure is followed as in Example 7, except melt mixing is accomplished at 140°-160° C. and the mix is extruded into the button mold maintained at 120°-130° C. Then the buttons are irradiated and heat treated as in Example 8. Acetone extraction of one of the buttons gives an average of 45% of acetone insolubles. The buttons are yellow and transparent.

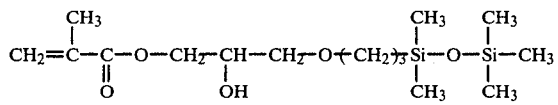

Lenses from these buttons give an oxygen transmissibility of $7.0 \times 10^{-10}$ ml.cm./sec.cm$^2$.cm.Hg.

EXAMPLE 11

About 8.5 parts by weight of CAB-381-20 are admixed with 1.5 parts by weight of Paraplex G-31 and 0.5 parts by weight of 1,6-hexanediol diacrylate employing a mortar and pestle. About 2-4 parts by weight of the composition are loaded into a Mini Max Molder for melt mixing at 170°-180° C. and extrusion into a button mold maintained at 140°-160° C. The molded button is cooled to room temperature and exposed to 10 Mrads of γ-ray radiation employing a Co$^{60}$ source. The irradiated buttons are lathed into suitable contact lenses and the lathings are subjected to an acetone extraction which yields 36% of acetone insolubles. The cured lenses have an O$_2$ transmissibility value of $2.9 \times 10^{-10}$ ml.cm./sec.cm$^2$.cm.Hg. The shore D hardness of the cured button is 78.

EXAMPLE 12

Following the procedure disclosed in Example 10, 7.5 parts by weight of CAB-381-20 are admixed with 1.5 parts by weight of F-820 and 1.0 parts by weight of dioctyl phthalate. After exposure to 10 Mrads of γ-rays, the irradiated buttons are lathed into suitable contact lenses and the lathings are subjected to an acetone extraction which yields 20% of acetone insolubles. The cured lenses have an O$_2$ transmissibility value, DK, of $4.4 \times 10^{-10}$ ml.cm./sec.cm$^2$.cm.Hg. The shore D hardness of the cured button is 75.

What is claimed is:

1. A shaped transparent contact lens of concavo-convex shape with the concave surface substantially conforming to the cornea of the eye, said lens being formed of a composition from the polymerization of a composition comprising an organic cellulose ester selected from the group of cellulose acetate, cellulose acetate butyrate, cellulose acetate propionate or mixtures thereof; and a polymerizable ethylenically unsaturated silicone ester.

2. The contact lens of claim 1 wherein said composition contains up to about 35% by weight of said silicone ester.

3. The contact lens of claim 1 or 2 wherein said composition can contain up to about 10% by weight of a crosslinking agent, up to about 10% by weight of a photoinitiator, up to about 2% by weight of an antioxidant, and up to about 30% by weight of an auxiliary plasticizer.

4. The contact lens of claim 3 wherein said composition contains about 0.1 to about 5% by weight of a crosslinking agent.

5. The contact lens of claim 3 wherein said composition contains about 0.1 to about 10% by weight of a photoinitiator.

6. The contact lens of claim 3 wherein said composition contains about 0.1 to about 5% by weight of a photoinitiator.

7. The contact lens of claim 3 wherein said composition contains about 5 to about 15% by weight of an auxiliary plasticizer.

8. The contact lens of claim 3 wherein said composition contains about 0.1 to about 1% by weight of an antioxidant.

9. The contact lens of claim 1 or 2 wherein said cellulose ester is cellulose acetate butyrate.

10. The contact lens of claim 1 wherein said composition contains up to about 35% by weight of said silicone ester.

11. The contact lens of claim 1 wherein said composition contains about 1 to about 35% by weight of said silicone ester.

12. The contact lens of claim 1 wherein said composition contains about 5 to about 15% by weight of said silicone ester.

13. The contact lens of claim 2 wherein said silicone ester is selected from the group of silicone esters of ethylenically unsaturated carboxylic acids, silane monomers containing vinyl group, silane monomers containing alkyl group, and mixtures thereof.

14. The contact lens of claim 2 wherein said silicone ester is monoethylenically unsaturated.

15. The contact lens of claim 2 wherein said silicone ester is a silicone ester of an ethylenically unsaturated carboxylic ester, and wherein said carboxylic acid is an aliphatic monocarboxylic and monoethylenic acid.

16. The contact lens of claim 2 wherein said silicone ester is a silicone ester of an ethylenically unsaturated carboxylic acid selected from the group of acrylic acid, methacrylic acid, crotonic acid, and mixtures thereof.

17. The contact lens of claim 2 wherein said silicone ester is represented by the formula:

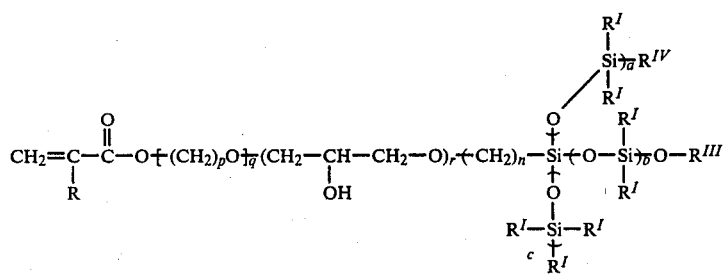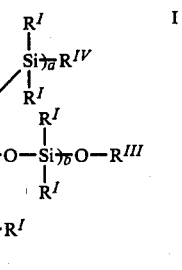

wherein
R is hydrogen or methyl;
each $R^I$ individually is methyl, phenyl or $O-SiR_3^{II}$;
each $R^{II}$ individually is methyl or phenyl;
$R^{IIII}$ is $SiR^{II}$ and $R^{IV}$ is $OSiR_3^{II}$; or
$R^{III}$ and $R^{IV}$ together form a single bond to form a cyclic ring;
each a, b, and c individually is an integer of 0-3;
p is an integer of 2-4;
q is an integer of 0-20;
n is an integer of 1-3; and
r is an integer of 0-1.

18. The contact lens of claim 2 wherein said silicone ester is represented by the formula:

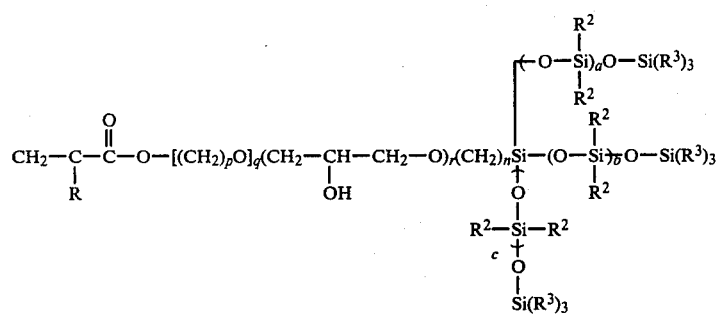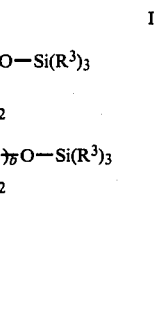

wherein
R is H or methyl;
each $R^2$ individually is $CH_3$, phenyl or $O-Si(CH_3)_3$;
each $R^3$ individually is $CH_3$ or phenyl;
each a, b, and c individually is an integer of 0-3;
p is an integer of 2-4;
q is an integer of 0-20;
n is an integer of 1-3; and
r is an integer of 0-1.

19. The contact lens of claim 2 wherein said silicone ester is represented by the formula:

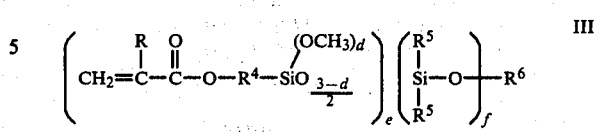

wherein
R is H or methyl;
$R^4$ is a divalent hydrocarbon radical having 1-10 carbon atoms, or a divalent hydrocarbon bridge having 1-10 carbon atoms and being broken by oxygen linkage;
each $R^5$ is $CH_3$; $R^6$ is $CH_3O_{0.5}$ or $(CH_3)_3 SiO_{0.5}$;
each d is an integer of 0-2;
e is an integer of 1-3 and f is an integer of 0-100, and provided that when f is 0, d is at least 1.

20. The contact lens of claim 19 wherein $R^4$ is an alkylene bridge.

21. The contact lens of claim 2 wherein said silane monomer is represented by the formula:

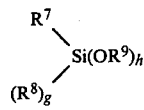

wherein
$R^7$ is vinyl or alkyl;
each $R^8$ individually is a monovalent saturated aliphatic hydrocarbon radical or a monovalent aromatic hydrocarbon radical;
each $R^9$ is an alkyl radical;
g is an integer of 0-2;
h is an integer of 1-3; and
the sum of g and h is 3.

22. The contact lens of claim 21 wherein $R^8$ is an alkyl radical of from 1 to 6 carbon atoms or an aryl radical containing 6–10 carbon atoms, and $R^9$ is an alkyl radical containing 1–6 carbon atoms.

23. The contact lens of claim 2 wherein said silane monomer is selected from the group of vinyl triethoxy silane, vinyl trimethoxy silane, vinyl phenol dimethoxy silane, vinyl tributoxy silane, and mixtures thereof.

24. The contact lens of claim 2 wherein said silicone ester is selected from the group of γ-pentamethyldisiloxanylpropyl methacrylate, tris (trimethylsiloxy)-α-methacryloxypropyl silane, heptamethylcyclotetrasiloxanyl methylmethacrylate, methyl-di (trimethylsiloxy) sylyl propyl glycerol methacrylate, pentamethyldisiloxanyl (propyl glycerol) monomethacrylate, pentamethyldisiloxanyl (propyl glycerol) ethylene glycol monomethacrylate, and mixtures thereof.

25. A blank from which a transparent contact lens of concavo-convex shape can be lathed wherein said blank or button is formed of a composition from the polymerization of a composition comprising an organic cellulose ester selected from the group of cellulose acetate, cellulose acetate butyrate, cellulose acetate propionate, or mixtures thereof; and a polymerizable ethylenically unsaturated silicone ester.

26. The blank of claim 25 wherein said composition contains about 1 to about 35% by weight of said silicone ester.

27. A rod from which blanks or buttons can be cut and from which a shaped transparent contact lens of concavo-convex shape can be lathed, wherein said rod is formed of a composition from the polymerization of a composition comprising an organic cellulose ester selected from the group of cellulose acetate, cellulose acetate butyrate, cellulose acetate propionate, or mixtures thereof; and a polymerizable ethylenically unsaturated silicone ester.

28. The rod of claim 27 wherein said composition contains about 1 to about 35% by weight of said silicone ester.

* * * * *

UNITED STATES PATENT AND TRADEMARK OFFICE
CERTIFICATE OF CORRECTION

PATENT NO. : 4,395,496

DATED : July 26, 1983

INVENTOR(S) : Wittmann, et al.

Page 1 of 2

It is certified that error appears in the above-identified patent and that said Letters Patent is hereby corrected as shown below:

Column 1, line 34, change "972" to --- 927 ---.

Column 4, delete the following formula I:

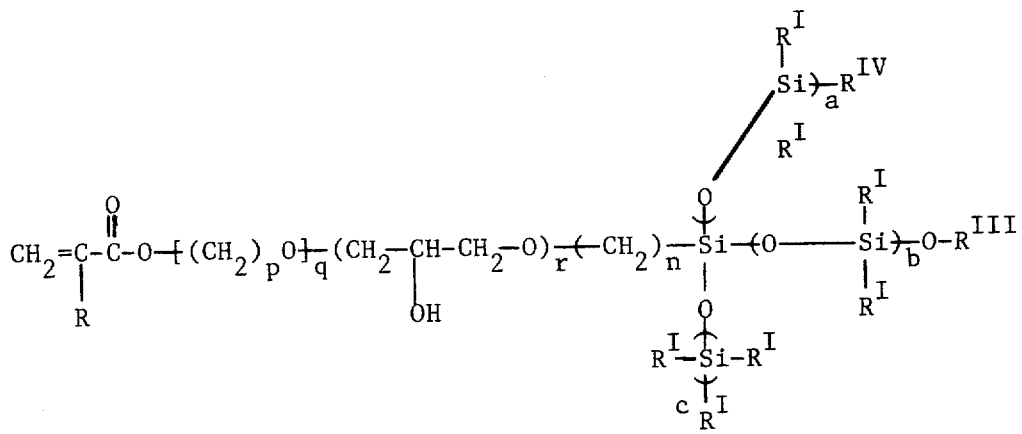

and insert the following formula I:

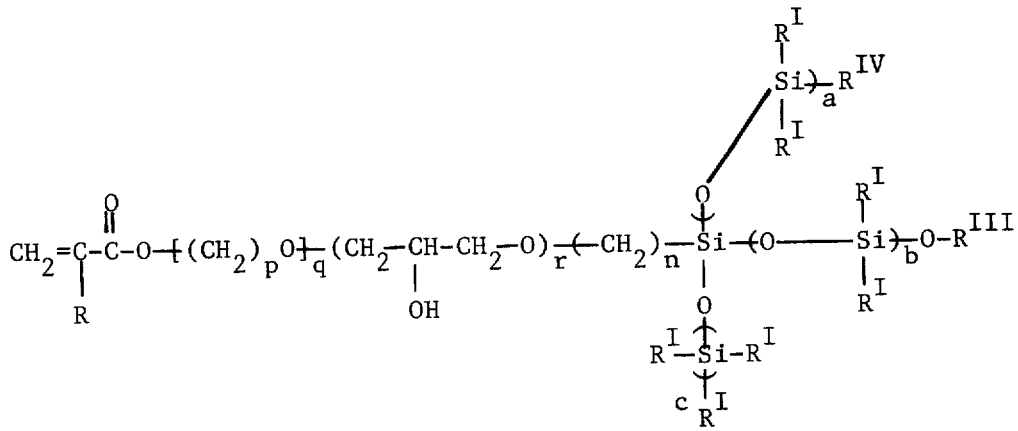

UNITED STATES PATENT AND TRADEMARK OFFICE
CERTIFICATE OF CORRECTION

PATENT NO. : 4,395,496
DATED : July 26, 1983
INVENTOR(S) : Wittmann, et al.

It is certified that error appears in the above-identified patent and that said Letters Patent is hereby corrected as shown below:

Column 5, line 61, after the formula please insert --- IV ---.

Column 7, line 6, change "methacrylte" to --- methacrylate ---.

Column 7, line 36, change "presentin" to --- present in ---.

Column 7, line 49, change "dipheyl" to --- diphenyl ---.

Column 8, line 26, change "N-alkyl" to --- n-alkyl ---.

Column 7, line 57, change "propane-dione" to --- propane dione ---.

Column 9, line 36, change "$CH_2CL$" to --- $CH_2CI$ ---.

Column 19, line 5, change "aklyl" to --- allyl ---.

Column 19, line 35, change "$R^{IIII}$" to --- $R^{III}$ ---.

Column 21, line 5, change "phenol" to --- phenyl ---.

Signed and Sealed this

Twenty-sixth Day of March 1985

[SEAL]

Attest:

DONALD J. QUIGG

Attesting Officer

Acting Commissioner of Patents and Trademarks